Patented July 23, 1940

2,209,004

UNITED STATES PATENT OFFICE 2,209,004

CYCLIC ESTERS AND PROCESS OF PREPARING SAME

Leopold Ruzicka, Zurich, Switzerland, assignor to Society of Chemical Industry in Basle, Basel, Switzerland No Drawing. Application October 26, 1935, Serial No. 46,967. In Switzerland October 31, 1934

8 Claims. (Cl. 260—397)

This invention relates to reduction products of cyclopentanopolyhydrophenanthrene-ketones and their derivatives such as are obtainable, for instance, from sterols or bile acids by oxidation with chromium oxide after protection of their hydroxyl groups. The cyclic alcohols thus obtained exist in two stereoisomeric forms. These alcohols are related to the parent ketone in that the hydroxyl group resulting from the hydrogenation of the ketone group lies, in one case, on one side of the ring system and, in the other case, on the opposite side.

By suitable choice of the conditions of the reduction, and particularly by adjustment of the reaction medium to an acid, neutral or alkaline reaction, it is possible to obtain only one of the two possible stereo-isomeric alcohols or a mixture of both forms.

There may be used as parent materials, for example, the hydroxy-ketones obtainable by the manufacture described in the aforesaid specification, as well as natural products of similar constitution or derivatives of these compounds, for example, esters, ethers or the like. From the hydroxy-ketones there are obtained, in accordance with the invention, stereo-isomeric diols. The reduction is advantageously conducted with activated hydrogen, for example by hydrogenation with hydrogen in presence of a catalyst of the platinum group or in presence of a nickel or cobalt catalyst or a mixture of catalysts or the like; it may also be conducted with the aid of nascent hydrogen, for example, by means of sodium and an alcohol. As a solvent for the catalytic hydrogenation, there may be used, for example, glacial acetic acid, an alcohol, such as methyl alcohol or ethyl alcohol, an ether and so on.

Regarding the stereo isomerism of the diols and their derivatives obtainable in accordance with the invention nothing definite can be said at present of the spacial constitution of the complete ring structure. In general, however, by catalytic hydrogenation in acid medium in the presence of a catalyst of the platinum group one isomer is formed almost exclusively, whilst in neutral or alkaline medium, and when reduction is conducted otherwise than by catalytic hydrogenation, there may be formed in considerable proportion the second isomer.

In the physiological action the products of the present invention resemble qualitatively those of the hydroxy-ketones from which they are derived but they are distinguished by an appreciably stronger action. Thus, for example, the diol of melting point 223° C. obtainable as described in Example 1, when tested on a capon, causes an increase of 20 per cent in the surface area of the comb when administered in a dose ⅓ as large as that required in the case of the parent hydroxy-ketone. A similar increase in the action is attained in the case of the diol-mono-acetate made as described in Example 6 in comparison with the acetate of the parent hydroxy-ketone.

The following examples illustrate the invention:

Example 1

16.7 mgs. of androsterone (3-epi-oxy-ätio-allocholanone-(17)) are hydrogenated in 1 cc. of glacial acetic acid in the presence of 50 mgs. of concentrated sulphuric acid and 7 mgs. of platinum oxide. After 1 molecular proportion of hydrogen has been absorbed the reaction mixture is mixed with ether, the catalyst is separated by filtration and the filtrate is washed with a caustic alkali solution and then with water. Then the ether is evaporated and the residue is boiled with a 0.4 n-alcoholic caustic alkali solution in order to saponify any acetylation product which is present. The alcohol is then evaporated under reduced pressure and the residue is mixed with ether and water. The product contained in the ethereal layer (amounting to 16.6 mgs.) has, even in the crude state a melting point of 220–222° C. (corrected). By recrystallisation from ethyl acetate the melting point is raised to 223° C. (corrected). Analysis corresponds with that of a diol $C_{19}H_{32}O_2$.

In order to prepare the di-acetate of the diol 110 mgs. of the diol, 2 cc. of dry pyridine and 2 cc. of acetic anhydride are heated together for a short time until dissolution has occurred. The whole is then allowed to stand for some time at room temperature and is then evaporated to dryness under reduced pressure and the crystalline residue is washed with methyl alcohol. The melting point of the diol di-acetate so obtained is 162–163° C. (corrected); it does not undergo alteration on recrystallisation from alcohol.

Example 2

44 mgs. of androsterone are hydrogenated in 1.5 cc. of alcohol of 95 per cent strength in presence of 16.4 mgs. of platinum oxide and 10 mgs. of concentrated sulphuric acid. The product is worked up in the manner described in Example 1 and, as in that example, there is obtained after recrystallisation a diol of melting point 223° C. (corrected).

Example 3

17.5 mgs. of androsterone are hydrogenated in 1.5 cc. of alcohol of 95 per cent strength in presence of 7 mgs. of platinum oxide. The reaction mixture is filtered and the catalyst is washed, whereupon the solvent is evaporated and the residue is recrystallised from ethyl acetate. There is obtained a mixture of diols the melting point of which lies at 205–208° C. (corrected);

after a further recrystallisation the melting point has risen to 213–215° C. (corrected). Analysis of both fractions corresponds with the formula $C_{19}H_{32}O_2$. By further purification, especially by repeated fractional crystallisation and by sublimation it is possible to separate the mixture of diols formed into the diol of melting point 223° C. described in Example 1 and a second diol which, after recrystallisation from ethyl-acetate, melts at about 205° C.

*Example 4*

28.7 mgs. of androsterone are hydrogenated in a solution of 50 mgs. of sodium in 1.5 cc. of alcohol of 95 per cent strength in presence of 11.2 mgs. of platinum oxide. The reaction mixture is extracted with ether in the presence of water, the ethereal layer is evaporated and the residue is recrystallised from ethyl acetate. There is obtained a mixture of diols of the formula $C_{19}H_{32}O_2$ melting at 211–213° C. (corrected).

As in Example 3, this product may likewise be separated into diols of higher and of lower melting points.

*Example 5*

28.7 mgs. of 3-epi-oxy-ätio-cholanone-(17) are hydrogenated in 1.5 cc. of alcohol of 95 per cent strength in the presence of 3 mgs. of platinum oxide. Hydrogenation is discontinued when one molecular proportion of hydrogen has been absorbed. Then the catalyst is removed by filtering and washed, the solvent is evaporated and the residue is recrystallised from ethyl acetate. There is obtained a diol of the formula $C_{19}H_{32}O_2$ melting sharply at 233–234° C. (corrected).

*Example 6*

72 milligrams of androsterone acetate are shaken in 3.5 cc. of alcohol, with addition of a drop of concentrated sulphuric acid and of platinum oxide, in presence of hydrogen. After a molecular proportion of hydrogen has been absorbed, the catalyst is removed, the liquid is mixed with water and ether and the ethereal layer is separated and dried. After distilling the ether, the residue is re-crystallised from methanol; it is a diol-monoacetate of the formula $C_{21}H_{34}O_3$ and forms brilliant plates of melting point 183–183.5° C.

By starting from androsterone-benzoate of melting point 178–178.5° C., the corresponding diol-monobenzoate of melting point 215–220° may be obtained in an analogous manner. By recrystallization for example from alcohol, this melting point may be raised to 226–228° C.

*Example 7*

50 mgs. of androsterone are dissolved in 2 cc. of alcohol and the solution is shaken at 40° C. in presence of hydrogen and in presence of a nickel catalyst deposited on a carrier of powdered clay. When the calculated quantity of hydrogen has been absorbed the whole is filtered to remove the catalyst, the filtrate is evaporated and the diol mixture which remains is purified in the manner described in Example 3.

*Example 8*

50 mgs. of androsterone in 10 cc. of boiling methyl-alcohol are reduced by the addition of 0.5 gram of sodium. The reaction solution is worked up by the addition of water and ether and the portion soluble in ether is allowed to stand with an alcoholic solution of semi-carbazide acetate in order to remove any small quantity of hydroxy-ketone which may be present. After the solution has been evaporated the residue is extracted with cold ether, the ethereal extract is evaporated and the residue is purified by recrystallisation from ethyl acetate and sublimation in a high vacuum (at about 130° C. under about 0.01 mm. pressure). In this manner from the mixture of diols which is formed there is obtained the pure diol of melting point 223° C.

*Example 9*

To a solution prepared by dissolving 1 gram of amalgamated aluminium in 100 cc. of anhydrous isopropyl-alcohol there is added 0.1 gram of androsterone and 90 cc. of the solvent are distilled gradually in the course of 5 hours. The reaction product is taken up in ether and the ethereal solution is washed several times with water. After evaporation of the solvent there is obtained a crystalline mixture of the two stereo-isomeric diols; it melts at about 200–210° C. and may find practical application as such. By fractional crystallisation, for example from ethyl acetate, or by fractional sublimation in a high vacuum, it is possible to separate it into fractions enriched in one of the components or into the components in pure form.

*Example 10*

900 mgs. of the mono-succinic ester of androsterone (melting point 185° C. corrected; prepared from the hydroxy-ketone by heating with succinic anhydride) are reduced by means of hydrogen in 40 cc. of dioxane with the addition of 4.5 cc. of water and 120 mgs. of concentrated sulphuric acid and in the presence of 500 mgs. of platinum oxide. The reaction product is taken up in ether and the ethereal solution is well washed with water and dried. On concentrating the ethereal solution the hydrogenated ester crystallises. After recrystallisation from ether the product has a constant melting point of 207–208° C.

*Example 11*

290 mgs. of isoandrosterone (3-oxy-ätio-allo-cholanone-(17)) are reduced with hydrogen in the presence of 34 mgs. of platinum oxide in 6 cc. of glacial acetic acid with the addition of 0.16 cc. of concentrated hydrochloric acid. The absorption of hydrogen, which amounts to 1 molecular proportion, is finished after a short time. The catalyst is then removed by filtering, the filtrate is diluted with water and the reduction product is extracted by means of ether. The ethereal solution is washed until neutral and then evaporated and the residue is boiled with a solution of potassium hydroxide in methyl-alcohol in order to saponify the product. By addition of hot water there are obtained crystals which are filtered, dried and recrystallised from ethylacetate. In this manner there is obtained directly a unitary diol which, when thoroughly dried, melts at 168° C. (corrected).

What I claim is:

1. The cyclic compounds of the formula

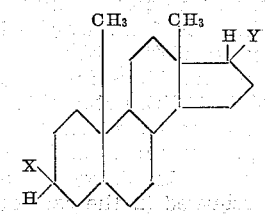

wherein X represents a member of the group consisting of $C_6H_5COO-$,

HOOC—$CH_2$—$CH_2$—COO— and $CH_3COO-$, and Y represents a member of the group consisting of OH and $CH_3COO-$, Y being $CH_3COO-$ only when X is $CH_3COO$.

2. A process for the manufacture of an alcohol comprising reducing the cyclic ketone of the formula

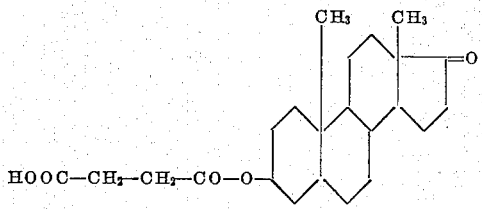

of melting point 185° C. (corrected), in an acid medium by means of hydrogen in the presence of a catalyst of the platinum group and in the presence of a strong mineral acid.

3. The compound of the formula

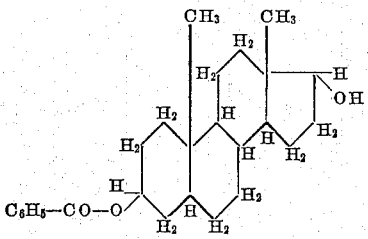

forming white crystals of melting point 215–220° C.

4. The compound of the formula

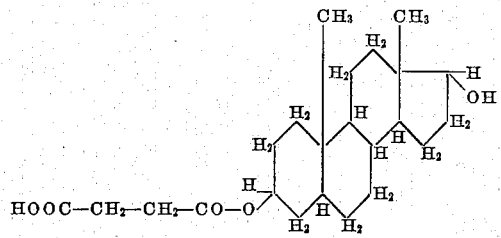

forming white crystals of melting point 207–208° C.

5. The monobenzoate of an androstandiol having the structural formula

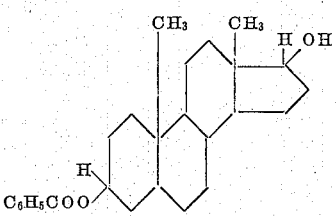

6. The diacetate of an androstandiol having the structural formula

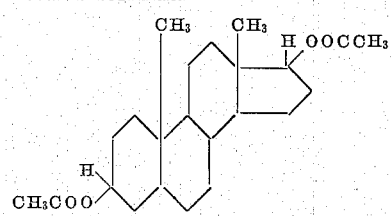

7. The isolated pure crystalline monobenzoate of an androstandiol having the structural formula

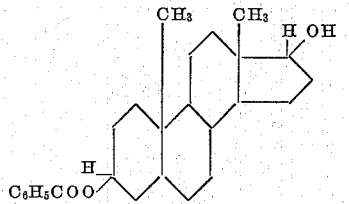

8. The isolated pure crystalline diacetate of an androstandiol having the structural formula

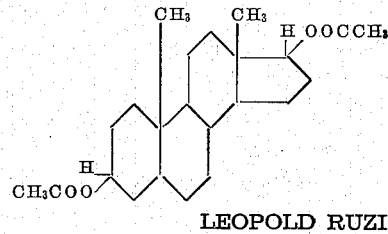

LEOPOLD RUZICKA.